(12) United States Patent
Sharma et al.

(10) Patent No.: US 9,730,091 B2
(45) Date of Patent: Aug. 8, 2017

(54) METHOD AND SYSTEM IMPROVING THE RELIABILITY OF WIRELESS FIRE DETECTION SYSTEMS

(71) Applicant: Honeywell International Inc., Morristown, NJ (US)

(72) Inventors: Gourav Sharma, Bangalore (IN); Vinayak Sadashiv Kore, Bangalore (IN); Naveen G, Bangalore (IN); Shreelatha M, Bangalore (IN); Deepak Sundar Vaidyanathan, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/926,424

(22) Filed: Oct. 29, 2015

(65) Prior Publication Data
US 2017/0127301 A1    May 4, 2017

(51) Int. Cl.
| | |
|---|---|
| H04W 84/18 | (2009.01) |
| H04W 24/04 | (2009.01) |
| H04W 4/00 | (2009.01) |
| H04L 12/24 | (2006.01) |
| G08B 19/00 | (2006.01) |
| G08B 29/18 | (2006.01) |

(52) U.S. Cl.
CPC .......... *H04W 24/04* (2013.01); *G08B 19/005* (2013.01); *G08B 29/18* (2013.01); *H04L 41/0836* (2013.01); *H04W 4/005* (2013.01)

(58) Field of Classification Search
None
See application file for complete search history.

(56) References Cited

U.S. PATENT DOCUMENTS

| | | | | |
|---|---|---|---|---|
| 7,668,083 | B1* | 2/2010 | Elliott | H04B 7/18584 370/216 |
| 8,194,592 | B2 | 6/2012 | Kore et al. | |
| 2009/0315699 | A1* | 12/2009 | Satish | G08B 25/009 340/533 |
| 2010/0177684 | A1* | 7/2010 | Kore | H04W 84/18 370/328 |

(Continued)

FOREIGN PATENT DOCUMENTS

EP    2 677 508 A1    12/2013

*Primary Examiner* — Brandon Renner
(74) *Attorney, Agent, or Firm* — Husch Blackwell LLP (57) ABSTRACT

A system is provided that includes a plurality of sensors that detect threats within a secured geographic area, a control panel that monitors the plurality of sensors for activation, a primary control unit that forms a primary mesh network coupling the plurality of sensors with the control panel based upon relative link quality, wherein the primary mesh network is defined by a primary routing table, and a redundant control unit that forms a secondary mesh network coupling the plurality of sensors with the control panel based upon the relative link quality, wherein the secondary mesh network includes a respective relationship of each of the plurality of sensors defined by a secondary routing table, wherein the redundant control unit is located in a different geographic location than the primary control unit within the secured geographic area, and wherein the secondary routing table is different than the primary routing table.

18 Claims, 5 Drawing Sheets

(56) References Cited

U.S. PATENT DOCUMENTS

| | | | |
|---|---|---|---|
| 2010/0238018 A1* | 9/2010 | Kelly | G08B 17/10 340/517 |
| 2014/0269257 A1* | 9/2014 | Mandiganal | G08B 25/10 370/221 |
| 2015/0078198 A1* | 3/2015 | Estevez | H04W 40/00 370/254 |
| 2015/0228183 A1* | 8/2015 | Rothkopf | G08B 21/22 340/539.1 |
| 2016/0043814 A1* | 2/2016 | Bishop | H04W 24/00 370/242 |

* cited by examiner

METHOD AND SYSTEM IMPROVING THE RELIABILITY OF WIRELESS FIRE DETECTION SYSTEMS

FIELD

This application relates to security systems and, more particularly, to wireless communication within security systems.

BACKGROUND

Systems are known to protect people and assets within secured areas. Such systems are typically based upon the use of one or more sensors that detect threats within the areas.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In case of intruders, sensors may be placed in different areas based upon the respective uses of those areas. For example, if people are present during some portions of a normal day and not at other times, then sensors may be placed along a periphery of the space to provide protection while the space is occupied while additional sensors may be placed within an interior of the space and used when the space is not occupied.

In most cases, threat detectors are connected to a local control panel. In the event of a threat detected via one of the sensors, the control panel may sound a local audible alarm. The control panel may also send a signal to a central monitoring station.

While conventional security systems work well, it is sometimes difficult or impossible to maintain connections with the wireless sensors used within such systems. Accordingly, a need exists for better methods and apparatuses for forming reliable connections with wireless sensors.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or the claims to the specific embodiment illustrated.

Figure 1:
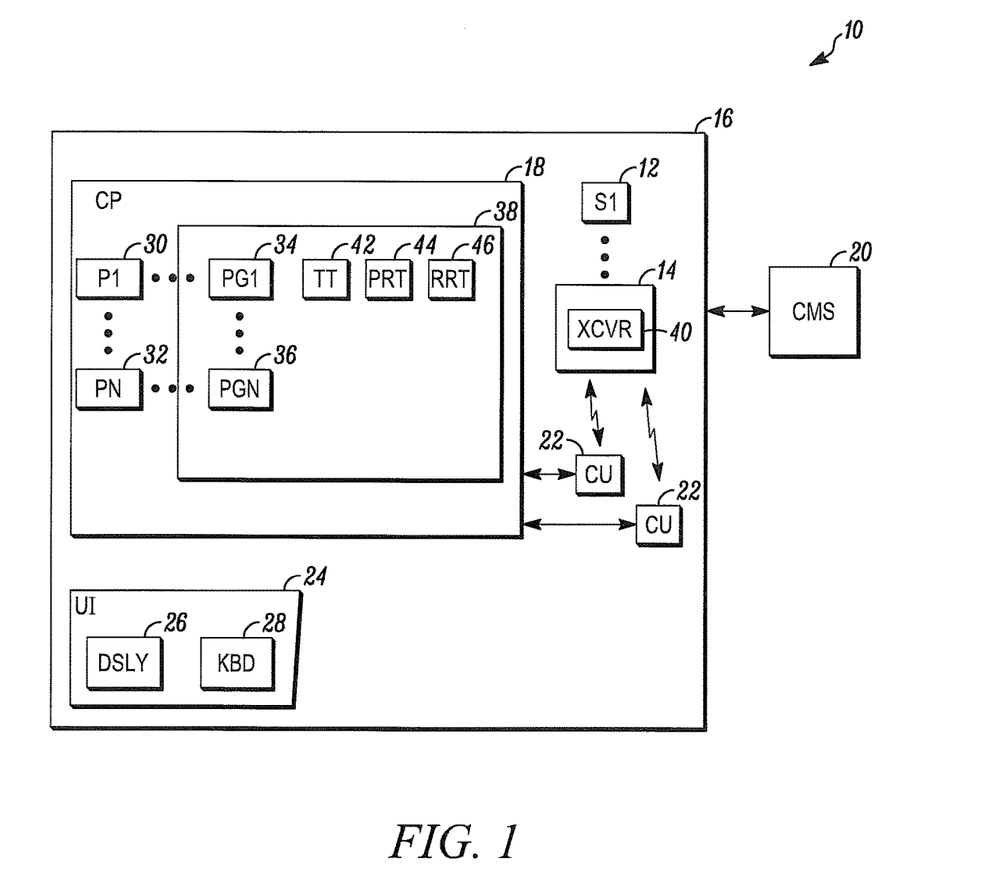
FIG. 1 is a block diagram of a security system in accordance herewith.

FIG. 1 is a block diagram of a security system 10 shown generally in accordance with an illustrated embodiment. Included within the system are a number of wireless sensors 12, 14 that detect threats within a secured geographic area 16.

The sensors may be embodied to detect any of a number of different types of threats. For example, some of the sensors may be limit switches placed on the doors and/or windows providing entrance into and egress from the secured area. Other ones of the sensors may be passive infrared (PIR) devices intended to detect intruders who have been able to circumvent sensors located along a periphery of the secured area.

Still other ones of the sensors may be environmental detectors. For example, at least some of the sensors may be fire, smoke, and/or carbon monoxide detectors.

The sensors may be monitored by a control panel 18 through at least two communication control units 22, including a primary control unit and a redundant control unit. The control panel may be located within the secured area (as shown in FIG. 1) or located remotely.

Upon detection of the activation of one of the sensors, the control panel sends an alarm message to a central monitoring station 20. The central monitoring station may respond by summoning help (e.g., police, fire department, etc.).

The security system may be controlled via a user interface 24. For example, an authorized human user may arm or disarm the system by entering a personal identification number (PIN) and activating a function through a keyboard 28. The status of the security system, in turn, may be shown on a display 26.

Included within the control panel, the user interface, the control units, and each of the sensors may be control circuitry that accomplishes the functionality discussed below. For example, the control circuitry may include one or more processor apparatuses (processors) 30, 32, each operating under control of a computer program 34, 36 loaded from a non-transient computer readable medium (memory) 38. As used herein, reference to a step performed by a computer program is also reference to the processor that executed that step.

For example, a status processor may monitor the user interface for status changes. Upon entry of an arm command, the status processor enters the armed state. Upon entry of a disarm command, the status processor enters the disarmed state.

Similarly, an alarm processor monitors the sensors in the armed state. Upon activation of one of the sensors, the alarm processor composes the alarm message sent to the central monitoring station. The alarm message may include an identifier of the alarm system (e.g., an address, an account number, etc.), an identifier of the type of sensor, an identifier of the sensor, a location of the sensor, and a time.

Included within each of the sensors and the control units is a respective radio frequency transceiver 40. The control units may be connected to the control panel via a wired connection.

In general, the control units are gateways through which the sensors exchange messages with the control panel. The control units include a first, primary control unit and a second, redundant control unit.

The control panel communicates with the sensors within a repeating superframe defined by a number of frames. Each frame may be divided in time to define a number of time division multiple access (TDMA) slots. A beacon processor within the control units or the control panel may periodically transmit a beacon through its wireless transceiver in order to synchronize the sensors to the control panel.

In general, the frames and the superframe are defined by a timing table 42 saved within a memory of the control units or the control panel and each of the sensors. The receipt of the beacon by each sensor synchronizes the sensor to a common location within the timing table.

As defined within the timing table, the superframe may include at least a frame for transmission of messages to each of the sensors and a frame for transmission of messages from each of the sensors to the control panel. The sensors may be assigned to specific slots within respective frames for transmission and reception of messages. Other frames and/or slots may be reserved for registration of newly activated sensors with the control panel.

Upon activation, an unregistered sensor may search a predetermined frequency spectrum for a beacon from a nearby control panel. The beacon may include information identifying the control panel and a location of any frames and/or slots used for registration with the control panel.

Upon decoding the beacon, a newly activated sensor may transmit a registration message to the control panel. The control panel authenticates the sensor and assigns the sensor to a first slot for receipt of messages from the control panel and to a second slot for transmission of messages from the sensor to the control panel.

Registration of sensors with the control panel may be via a direct wireless connection or via other sensors using a mesh network. Newly activated sensors first attempt to register directly with the control panel. If the sensor is unsuccessful in registering directly with the control panel, then the sensor will search for nearby sensors and register with the control panel through the nearby sensors. In this case, the newly activated sensor becomes a child device or sensor, and the nearby sensor (through which the new device communicates) becomes the parent device or sensor.

Figure 2:
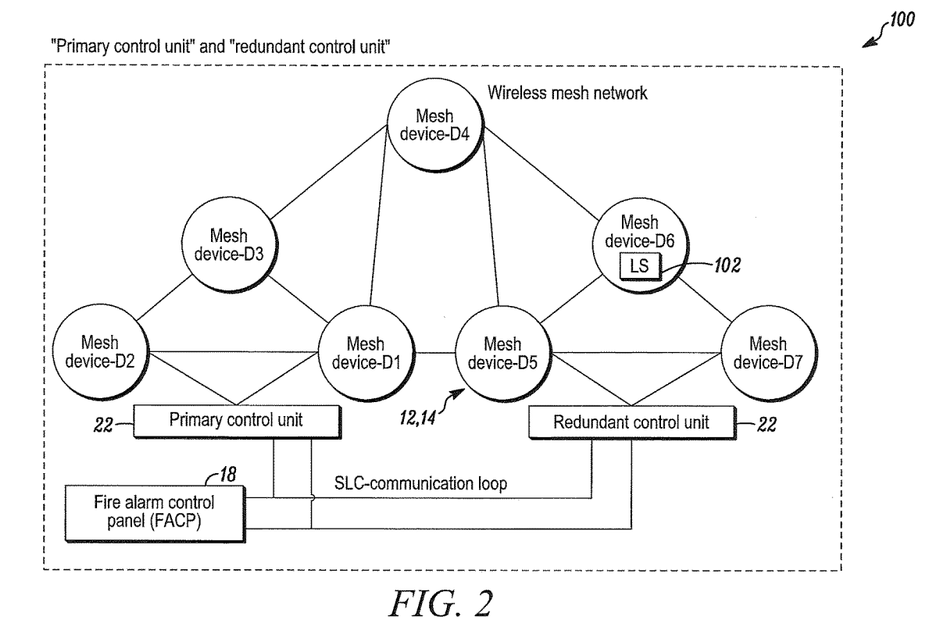
FIG. 2 is a block diagram of a mesh network used with the system of FIG. 1.

FIG. 2 depicts a communication system 100 used by the security system of FIG. 1. As shown in FIG. 2, the primary and redundant control units are coupled to the control panel in parallel and form redundant connections with the mesh network (and with each of the plurality of sensors) via geographically separate connection points. It should be specifically noted in FIG. 2 that the sensors of FIG. 1 are shown as mesh devices in FIG. 2.

The mesh network of FIG. 2 is formed automatically by the sensors and the control units as described above. In this regard, the sensors all form a mesh connection with the primary control unit through a primary mesh network and a separate mesh connection with the redundant control unit through a redundant or secondary mesh network. For example, when first activated, mesh devices (wireless sensors) D1, D2 search the predetermined spectrum for the relatively closest, most direct connection with the control panel. Using this process, the mesh devices D1, D2 discover that they have a direct, first connection with the control panel through the primary control unit. A direct connection, in this case, means that they are not connected to the control panel through any other sensors. The device D1 also forms a second connection with the primary control unit through the device D2. Similarly, the device D2 forms a second connection with the primary control unit through the device D1.

The sensors D3, D4, D5, D6, D7 find that they do not have a direct connection with the control panel through the primary control unit and, therefore, form a connection to the control panel through other sensors. The sensor D3 forms first and second connections through the sensors D1, D2. The sensor D4 forms a first connection through the sensors D3, D2 and a second connection through the sensor D1. The sensor D5 forms a first connection through the sensors D4, D3, D2 and a second connection through the sensor D1. The sensor D6 forms a first connection through the sensors D4, D3, D2 and a second connection through the sensors D5, D1. The sensor D7 forms a first connection through the sensors D6, D4, D3, D2 and a second connection through the sensors D5, D1. The routing of connections of the primary mesh network are saved in a primary routing table 44.

The sensors also independently form a second mesh network through the redundant control unit. In this case, the mesh devices D5, D7 search the predetermined spectrum for the closest, most direct connection with the control panel. Using this process, the mesh devices D5, D7 discover that they have a direct, first connection with the control panel through the redundant control unit. The device D5 also forms a second connection with the redundant control unit through the device D7. Similarly, the device D7 forms a second connection with the redundant control unit through the device D5.

The sensors D1, D2, D3, D4, D6 find that they do not have a direct connection with the control panel through the redundant control unit and, therefore, form a connection to the control panel through other sensors. The sensor D6 forms first and second connections through the sensors D5, D7. The sensor D4 forms a first connection through the sensor D5 and a second connection through the sensors D6, D7. The sensor D1 forms a first connection through the sensor D5 and a second connection through the sensors D4, D6, D7. The sensor D3 forms a first connection through the sensors D4, D6, D7 and a second connection through the sensors D5, D1. The sensor D2 forms a first connection through the sensors D3, D4, D6, D7 and a second connection through the sensors D1, D5. The routing of connections of the secondary mesh network are saved in a secondary or redundant routing table 46.

It should be noted in this regard that the routing of the primary and secondary mesh networks is based upon a value of link quality (e.g., received signal strength indication (RSSI), bit error rate (BER), etc.) determined by a measuring unit 102. In this case, each child device in the primary and secondary mesh networks measures the link quality of the connection with its parent device and with other nearby devices and selects the first and second paths based upon the best link quality. For example, the device D2 could form a second connection with the primary control unit through the device D1 or through the devices D3, D1. If the link quality through the device D3 is better than the link quality directly between the devices D1, D2, then the connection through the device D3 is selected.

In general, each sensor periodically measures a link quality of the radio frequency connection with its parent and reports the link quality to a link quality processor within the corresponding control unit. In response, the primary and secondary routing tables are dynamically adjusted to reflect the best connection through each of the mesh networks.

The primary mesh network forms the primary connection with each of the sensors of the system via the primary control unit. If the primary control unit fails, then a communication processor within the control panel detects this failure and reestablishes a connection with each of the sensors by activating the secondary mesh network through the redundant control unit.

A connection processor periodically performs a fault analysis and health check of the primary and secondary mesh networks. The fault analysis may include a fault processor sending a test message or pinging the most distant sensor through the mesh network. For example, in the case of the primary mesh network of FIG. 2, a message may be sent to the device D7 over the first and second connections. Similarly, in the case of the redundant control unit, a message may be sent to the device D2. If the fault processor should fail to detect a response, then the processor may send a similar message to the next closer device (e.g., the device D6 in the primary mesh network). By sending a sequence of test messages, the fault processor may detect a total or partial mesh failure.

In the case of a partial failure of the primary mesh network, the fault processor may partially activate the secondary mesh network to form a connection with any sensors downstream of a failed sensor.

Similarly, a health check processor may determine a link quality of each connection of the primary and secondary networks. The link quality (as discussed above) is used for amending the routing tables and for determining an overall health of the mesh networks. In this regard, the individual values of link quality may be compared with one or more thresholds to determine the overall reliability of the communication system and each of its links. The health check processor may generate a report showing the overall health of the individual links and the overall state of operation of the communication system.

The individual link values may also be used to assign at least some of the sensors to the redundant control unit. The report may display a list of these sensors in order to alert maintenance personnel of deficiencies in the communication system.

In wireless fire detection monitoring systems, reliability of the system is critical. The reliability of the mesh wireless network may be impacted by a number of environmental factors, including a fire in the building, sabotage, or arson attempts. In case of such an event, there is a chance of structural damage to the building and/or building systems, and this could lead to the failure of a control unit if it was installed in the affected area.

In the past, if the control unit that maintains and controls the mesh wireless network were to fail, then this event would result in a single point failure of the complete wireless fire system by breaking the communication connection with all of the wireless devices. This would cause a complete failure in the delivery of critical messages between wireless transceivers and the fire alarm control panel (FACP), resulting in potential catastrophic damage to life and to the premises.

Single point failure can be avoided by including a redundant control unit in the wireless fire detection monitoring and control systems that can control and maintain the entire network in case of any failure in the primary control unit. The use of a redundant control unit increases the probability that the mesh wireless network will remain intact and that all critical messages will be communicated to the fire alarm control panel, thus reducing the risk due to complete or partial failure of the primary control unit.

The placement of the redundant control unit in a different physical location at the time of installation provides spatial diversity, thus providing additional fire protection to the premises in case of any failure to the primary control unit. Under one embodiment, an application executing within an installer's laptop computer may communicate with the control panel and/or the control units to collect RSSI values from each sensor through both the primary and redundant control units. In this regard, the application executing on a processor of the laptop processes the RSSI values to identify groupings of sensors and the sensor connected to the primary control unit through the greatest relative number of other sensors (i.e., the greatest number of parent/child relationships). The application may propose one or more locations for placement of the redundant control unit, giving greatest weight to the sensor having the greatest number of connections with the control panel through other sensors. In this regard, choosing a location based upon the greatest number of connections through other sensors allows the redundant control unit to be placed as far as possible from the primary control unit, thereby maximizing spatial diversity of the wireless connections. The user may select one of the proposed locations based upon distance or based upon the greatest the highest relative RSSI values among all of the sensors.

During partial damage to some parts of the building, the damage could result in failure of intermediate wireless transceivers that may form a critical part of the mesh wireless network. In such cases, a redundant control unit helps in reestablishing contact with the isolated part of the network.

The identification of a location for a redundant control unit can be accomplished as explained below. For example, in premises where a wireless transceiver is installed within the primary control unit, wireless transceivers of each of the sensors will be automatically connected to the primary control unit and will form the primary mesh wireless network. The primary control unit will then initiate a process to collect information about the link quality of all wireless transceivers in the network and restructure the links between the wireless transceivers to obtain the best connectivity. This becomes the primary routing table for the mesh wireless network.

The installer can then select the best location for the redundant control unit based on various factors, such as spatial diversity, link connectivity, furthest location from the primary control unit, and feasibility in terms of installation. After identification of a location, the redundant control unit will be installed in the identified location. The redundant control unit will become part of the mesh wireless network.

The redundant control unit obtains the link quality information of the complete network in a similar way as the primary control unit and generates a backup routing table. The redundant control unit then broadcasts this backup routing table to all of the devices in the mesh wireless network. As a result of this, the complete network will have two routing tables. One routing table is from the active primary control unit, and another routing table is from the redundant control unit.

Any network updates will be indirectly heard by the redundant control unit, thereby ensuring that any network level change triggers the redundant control unit to re-evaluate and resend the updated backup routing table to the network wireless transceivers.

The redundant control unit may be located and integrated into the system using a set of steps as follows. First, at the time of installation, an installer determines the best location for the redundant control unit such that it has the best connectivity with the neighboring devices so that, in case the primary control unit fails for any reason, the redundant control unit should be able to step in and manage the network. Just as the primary control unit evaluates the network connectivity at the time of commissioning of the system, the redundant control unit also will evaluate the link connectivity with all wireless transceivers. Once connectivity with the wireless transceivers is evaluated, the connectivity is reported to the primary control unit.

The system of FIG. 1 uses two network routing tables, including one for the primary control unit and another for the redundant control unit, where both routing tables are present in the wireless transceivers at all times. At any point in time, the primary control unit and its routing table are active, and in case the primary control unit fails, the redundant control unit and its routing table become active and begin controlling communication with the wireless transceivers. The redundant control unit is also part of the same mesh wireless network as the primary control unit and otherwise acts as a wireless transceiver device between the mesh's parent and child devices while the primary control unit is active and alive.

The primary and redundant control units are connected to the FACP using a standard signaling line circuit. The FACP periodically monitors the health of both the primary and redundant control units. In case of a detected failure in the primary control unit, the FACP commands the redundant control unit to take control of the mesh network. The redundant control unit takes control of the mesh network by considering commands from the FACP as well as health check data of the network.

For example, in case of the primary control unit failure, the redundant control unit takes control of the entire mesh wireless network. Following are the steps involved in taking control of the network. First, there are two control commands through which the redundant control unit will decide whether to become active or not. One control command will flow from the FACP to the redundant control unit indicating the primary control unit failure. The FACP polls each control unit (primary as well redundant). Only when communication with the primary control unit is broken will the FACP send a command to the redundant control unit instructing it to take control of the complete mesh wireless network. Another command is an end to end health check that the primary control unit maintains. Each wireless transceiver will broadcast the link connectivity to its parent and the complete mesh network as part of the health message. This allows the devices to see if the connectivity with the primary control unit is intact or not. The end to end health check helps the redundant control unit check the mesh network's health. In case of any partial connectivity loss in the network that leaves any part of the network isolated from the primary control unit, the redundant control unit takes control of the isolated part of the mesh wireless network. The redundant control unit communicates the change to the FACP.

Once the redundant control unit takes control of the mesh network, it becomes the master source to maintain the time synchronization between the wireless transceivers. The child device time base synchronizes itself to its parent device directly, and the same method continues at each hop level. Finally at hop level 1, directly connected child nodes of a control unit are time synchronized with the control unit.

Figure 3:
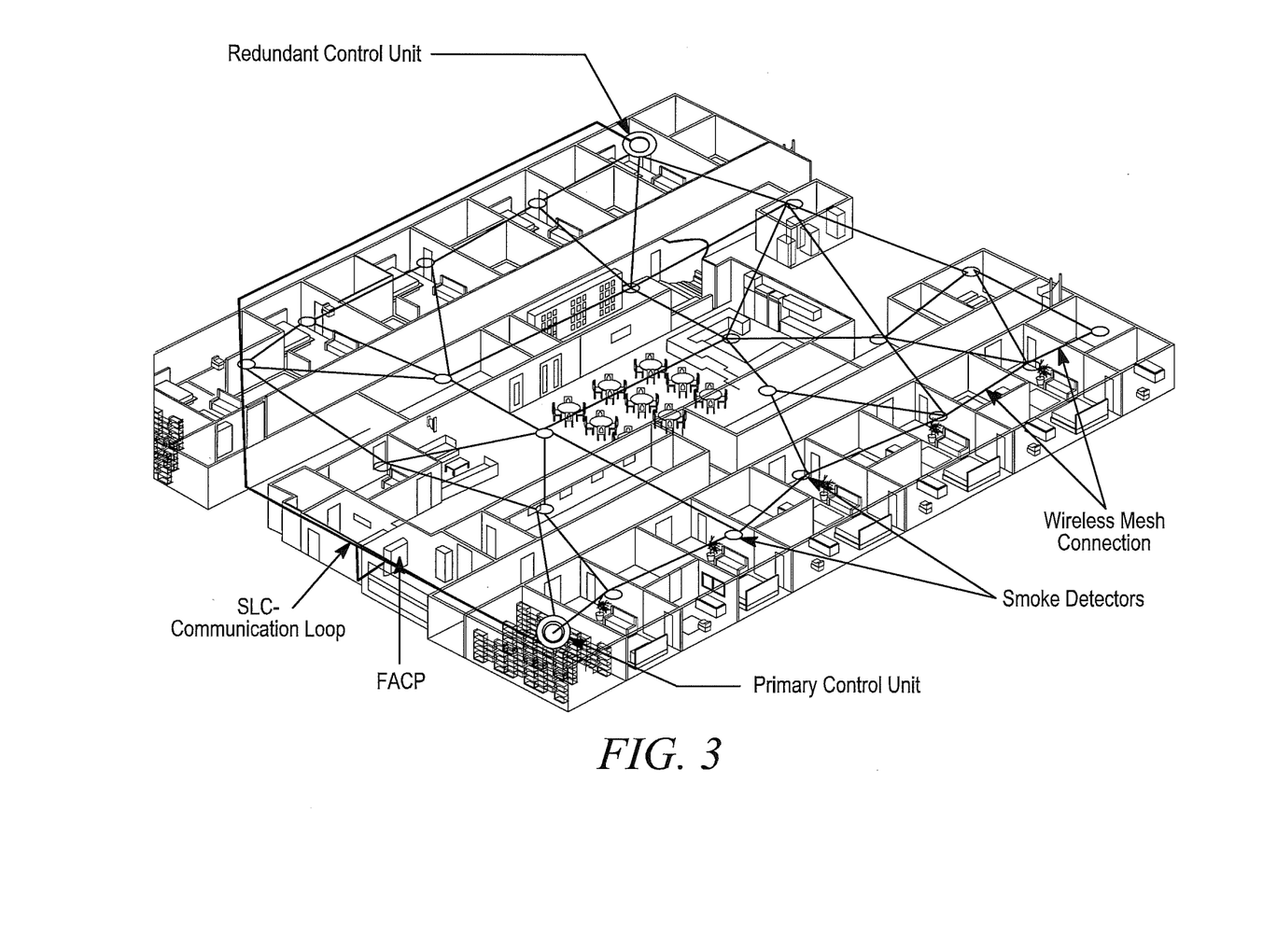
FIG. 3 depicts a geographic area showing the mesh network of FIG. 1.
Figure 4:
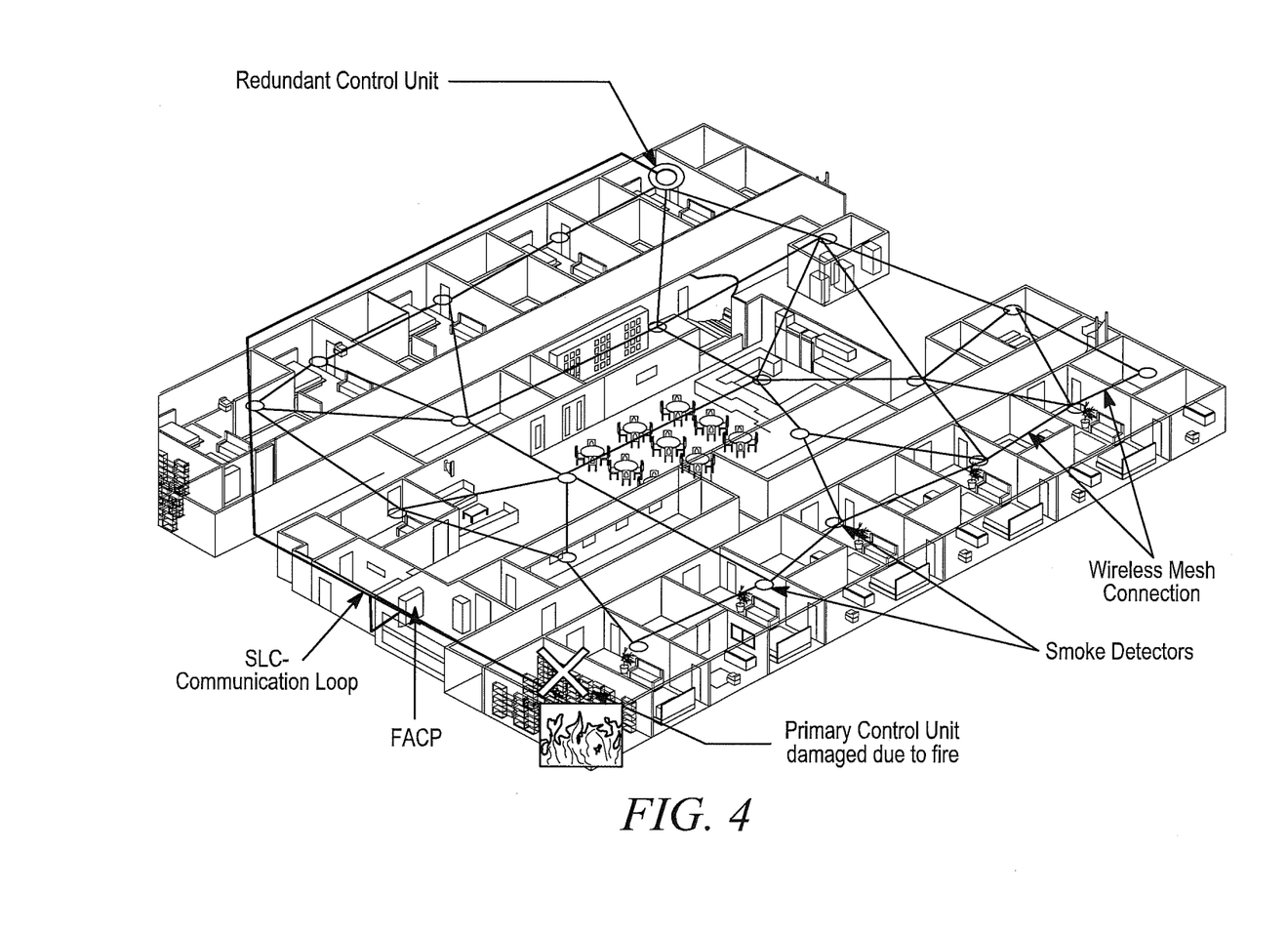
FIG. 4 shows an example of a primary control unit failing.
Figure 5:
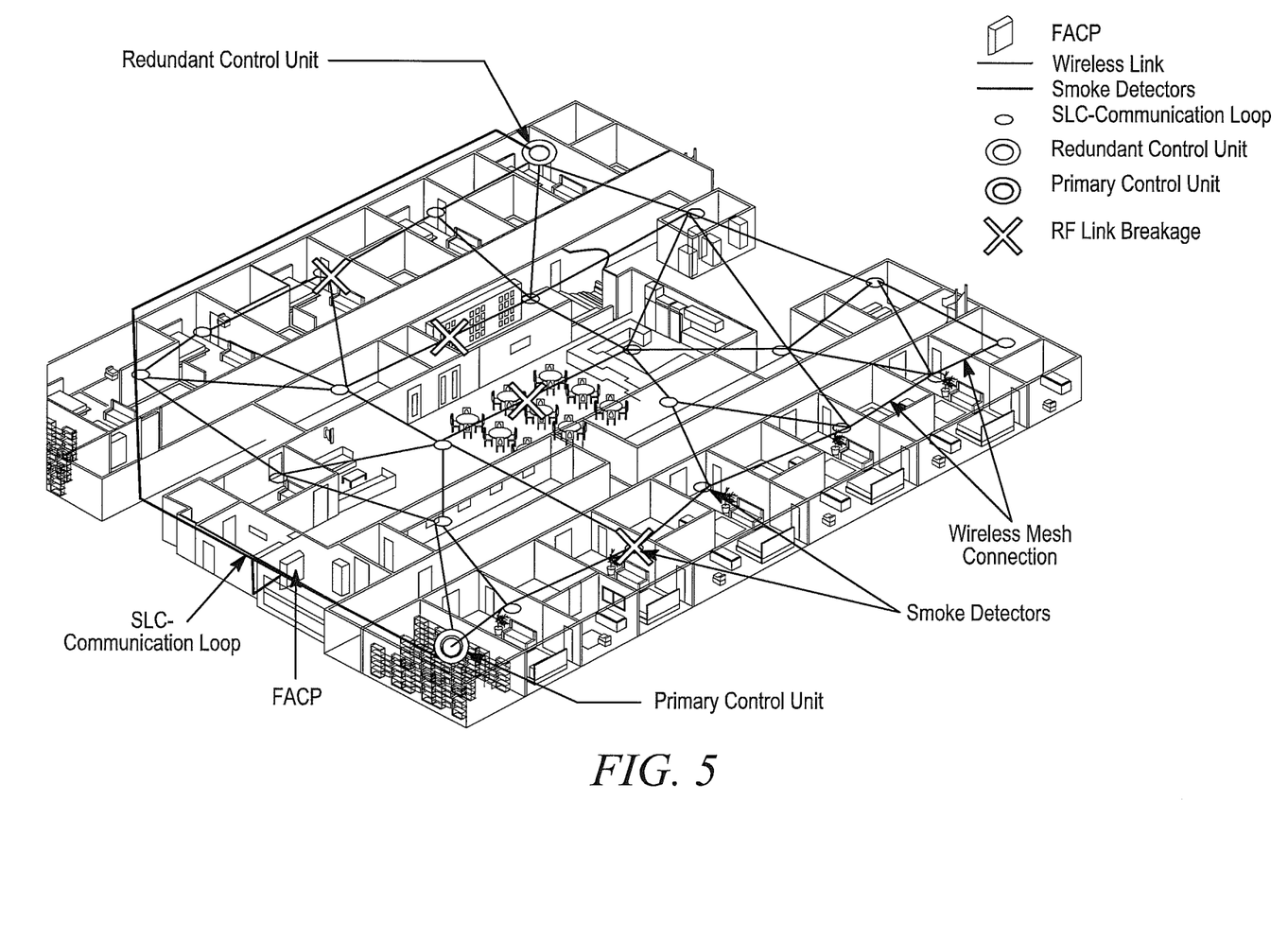
FIG. 5 shows an example of a partial failure when primary and redundant control units share a mesh connection.

FIGS. 3-5 depict an example of the system of FIG. 1. In this regard, FIG. 3 shows a mesh network connected to both the primary and secondary control units.

FIG. 4 depicts the situation of the primary control unit failing. In this case, the redundant control unit assumes control of the mesh network.

FIG. 5 shows failure of parts of the mesh network (shown by the Xs). In this case, the primary control unit retains control of part of the mesh network while the redundant control unit takes control of any undamaged sensors.

In general, the system includes a plurality of wireless sensors that detect threats within a secured geographic area, a control panel that monitors the plurality of sensors for activation, a primary control unit including one or more processors that forms a primary wireless mesh network coupling the plurality of sensors with the control panel based upon relative link quality, wherein the primary mesh network, including a first respective parent or child relationship of each of the plurality of sensors within the primary mesh network, is defined by a primary routing table, and a redundant control unit including one or more processors that forms a secondary wireless mesh network coupling the plurality of sensors with the control panel based upon the relative link quality, wherein the secondary mesh network, including a second respective parent or child relationship of each of the plurality of sensors within the secondary mesh network, is defined by a secondary routing table, wherein the redundant control unit is located in a different geographic location than the primary control unit within the secured geographic area, and wherein the secondary routing table is different than the primary routing table.

Alternatively, the system includes a security system that protects a secured geographic area, a plurality of wireless sensors of the security system that detect threats within the secured geographic area, a control panel of the security system that monitors the plurality of sensors for activation, a primary control unit including one or more processors that forms a primary wireless mesh network of a plurality of wireless transceivers, each coupling a respective different at least one of the plurality of sensors with the control panel based upon relative link quality, wherein a first set of connections of the primary mesh network, including a first respective parent or child relationship of each of the plurality of wireless transceivers within the primary mesh network, is defined by a primary routing table, and a redundant control unit including one or more processors that forms a secondary wireless mesh network of the plurality of wireless transceivers coupling the plurality of sensors with the control panel based upon the relative link quality, wherein a second set of the connections of the secondary mesh network, including a second respective parent or child relationship of each of the plurality of wireless transceivers within the secondary mesh network, is defined by a secondary routing table, wherein the redundant control unit is located in a different geographic location than the primary control unit within the secured geographic area, and wherein the secondary routing table is different than the primary routing table.

Alternatively, the system includes a security system that protects a secured geographic area, a plurality of wireless sensors of the security system that detect threats within the secured geographic area, a control panel of the security system that monitors the plurality of sensors for activation, a primary control unit including one or more processors that forms a primary wireless mesh network coupling each of the plurality of sensors with the control panel through at least a first respective one other of the plurality of sensors based upon relative link quality among geographically adjacent ones of the plurality of sensors, wherein a first set of connections of the primary mesh network, including a first respective parent or child relationship of each of the plurality of sensors within the primary mesh network, is defined by a primary routing table, and a redundant control unit including one or more processors that forms a secondary wireless mesh network coupling each of the plurality of sensors with the control panel through at least a second respective one of the plurality of sensors based upon the relative link quality between the geographically adjacent ones of the plurality of sensors, wherein a second set of the connections of the secondary mesh network, including a second respective parent or child relationship of each of the plurality of sensors within the secondary mesh network, is defined by a secondary routing table, wherein the redundant control unit is located in a different geographic location than the primary control unit within the secured geographic area and wherein the secondary routing table is different than the primary routing table.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. An apparatus comprising:
a plurality of sensors that detect threats within a secured geographic area;
a control panel that monitors the plurality of sensors for activation;
a primary control unit coupled to the control panel;
a mesh network coupled to the primary control unit and formed by respective links between each of the plurality of sensors; and
a redundant control unit coupled to the control panel, the primary control unit, and the mesh network,
wherein a type of the respective links for each of the plurality of sensors includes at least one of a first direct link between a respective one of the plurality of sensors and the primary control unit, a second direct link between the respective one of the plurality of sensors and the redundant control unit, and an indirect link between the respective one of the plurality of sensors and a different one of the plurality of sensors,
wherein the type of the respective links for the respective one of the plurality of sensors is determined by the respective one of the plurality of sensors based on a relative location of the respective one of the plurality of sensors to other members of the plurality of sensors, the primary control unit, and the redundant control unit,
wherein each of the plurality of sensors establishes, through the respective links, a respective first connection to the primary control unit and a respective second connection to the primary control unit different than the respective first connection based upon link quality and stores first data representing the respective first connection and the respective second connection in a primary routing table,
wherein each of the plurality of sensors establishes, through the respective links, a respective third connection to the redundant control unit and a respective fourth connection to the redundant control unit different than the respective third connection based upon the link quality and stores second data representing the respective third connection and the respective fourth connection in a secondary routing table,
wherein the primary control unit is located in a first geographic location within the secured geographic area, and the redundant control unit is located in a second, different geographic location within the secured geographic area, and
wherein the secondary routing table is different than the primary routing table.

2. The apparatus as in claim 1 wherein the second, different geographic location for the redundant control unit is based upon the respective first connection and the respective second connection of each of the plurality of sensors.

3. The apparatus as in claim 1 further comprising a security system.

4. The apparatus as in claim 1 wherein the plurality of sensors include one or more of a fire sensor and an intrusion sensor.

5. The apparatus as in claim 1 wherein the control panel is located at a third, different geographic location than both the primary control unit and the redundant control unit.

6. The apparatus as in claim 1 wherein a processor of the control panel periodically tests the respective first connection and the respective second connection between the primary control unit and each of the plurality of sensors and, upon detecting a failure, sends a command activating the redundant control unit.

7. The apparatus as in claim 1 further comprising a first processor of the control panel that performs an end-to-end health check of the mesh network.

8. The apparatus as in claim 7 further comprising a respective transceiver within each of the plurality of sensors that transmits the link quality of the respective one of the plurality of sensors to the other members of the plurality of sensors, the primary control unit, and the redundant control unit.

9. The apparatus as in claim 8 further comprising a second processor of the primary control unit and a third processor of the redundant control unit that receive the link quality from each the plurality of sensors and transmit a health message to the control panel, the health message indicative of an overall health of the mesh network.

10. An apparatus comprising:
a security system that protects a secured geographic area;
a plurality of sensors of the security system that detect threats within the secured geographic area;
a control panel of the security system that monitors the plurality of sensors for activation;
a primary control unit coupled to the control panel;
a mesh network coupled to the primary control unit and formed by respective links between each of a plurality of wireless transceivers associated with a respective one of the plurality of sensors; and
a redundant control unit coupled to the control panel, the primary control unit, and the mesh network,
wherein a type of the respective links for a respective one of the plurality of wireless transceivers includes at least one of a first direct link between the respective one of the plurality of wireless transceivers and the primary control unit, a second direct link between the respective one of the plurality of wireless transceivers and the redundant control unit, and at least one indirect link between the respective one of the plurality of wireless transceivers and a different one of the plurality of wireless transceivers,
wherein the type of the respective links for the respective one of the plurality of wireless transceivers is determined by a respective one of the plurality of sensors associated with the respective one of the plurality of wireless transceivers based on a relative location of the respective one of the plurality of sensors to other members of the plurality of sensors, the primary control unit, and the redundant control unit,
wherein each of the plurality of sensors establishes, through the respective links and the respective one of the plurality of wireless transceivers, a respective first connection to the primary control unit and a respective second connection to the primary control unit different than the respective first connection based upon link quality and stores first data representing the respective first connection and the respective second connection in a primary routing table, wherein each of the plurality of sensors establishes, through the respective links and the respective one of the plurality of wireless transceivers, a respective third connection to the redundant control unit and a respective fourth connection to the redundant control unit different than the respective third connection based upon the link quality and stores second data representing the respective third connection and the respective fourth connection in a secondary routing table, wherein the primary control unit is located in a first geographic location within the secured geographic area, and the redundant control unit is located in a second, different geographic location within the secured geographic area, and wherein the secondary routing table is different than the primary routing table.

11. The system as in claim 10 further comprising a processor of the control panel that transmits, over the mesh network, a wireless beacon synchronizing each of the plurality of wireless transceivers to the control panel.

12. The system as in claim 11 further comprising a repeating superframe of a time division multiple access slot used by the plurality of wireless transceivers for exchanging messages between the control panel and the plurality of sensors.

13. The system as in claim 10 wherein each of the plurality of sensors adjusts the respective first connection, the respective second connection, the respective third connection, and the respective fourth connection based upon changes in the link quality of the respective one of the plurality of wireless transceivers.

14. The system as in claim 10 further comprising a processor of the control panel that detects a failure of the respective first connection and the respective second connection of the respective one of the plurality of sensors.

15. The system as in claim 14 wherein the processor of the control panel establishes, in response to the failure, a communication connection with the respective one of the plurality of sensors through the respective third connection and the respective fourth connection.

16. The system as in claim 10 further comprising a processor of the control panel that detects a failure of the respective first connection and the respective second connection of the respective one of the plurality of sensors and automatically activates communication between the control panel and the respective one of the plurality of sensors through the respective third connection and the respective fourth connection.

17. An apparatus comprising:
a security system that protects a secured geographic area;
a plurality of sensors of the security system that detect threats within the secured geographic area;
a control panel of the security system that monitors the plurality of sensors for activation;
a primary control unit coupled to the control panel;
a mesh network coupled to the primary control unit and formed by respective links between each of the plurality of sensors; and
a redundant control unit coupled to the control panel, the primary control unit, and the mesh network,
wherein a respective type of the respective links for each of the plurality of sensors includes at least one of a first direct link between a respective one of the plurality of sensors and the primary control unit, a second direct link between the respective one of the plurality of sensors and the redundant control unit, and an indirect link between the respective one of the plurality of sensors and a different one of the plurality of sensors,
wherein the respective type of the respective links for the respective one of the plurality of sensors is determined by the respective one of the plurality of sensors based on a relative location of the respective one of the plurality of sensors to other members of the plurality of sensors, the primary control unit, and the redundant control unit,
wherein each of the plurality of sensors establishes, through the respective links, a respective first connection to the primary control unit based upon link quality and stores first data representing the respective first connection in a primary routing table,
wherein each of the plurality of sensors establishes, through the respective links, a respective second connection to the redundant control unit different than the respective first connection based upon the link quality and stores second data representing the respective second connection in a secondary routing table,
wherein the primary control unit is located in a first geographic location within the secured geographic area, and the redundant control unit is located in a second, different geographic location within the secured geographic area, and
wherein the secondary routing table is different than the primary routing table.

18. The system as in claim 17 wherein each of the plurality of sensors amends the primary routing table and the secondary routing table based upon changes in the link quality.

* * * * *